Aug. 28, 1962     M. TERHO     3,051,339
LOADING AND UNLOADING EQUIPMENT FOR A MOTOR TRUCK
Filed Dec. 30, 1957     2 Sheets-Sheet 1

INVENTOR.
MIKKO TERHO
BY Herman L. Gordon
ATTORNEY

Aug. 28, 1962 M. TERHO 3,051,339
LOADING AND UNLOADING EQUIPMENT FOR A MOTOR TRUCK
Filed Dec. 30, 1957 2 Sheets-Sheet 2
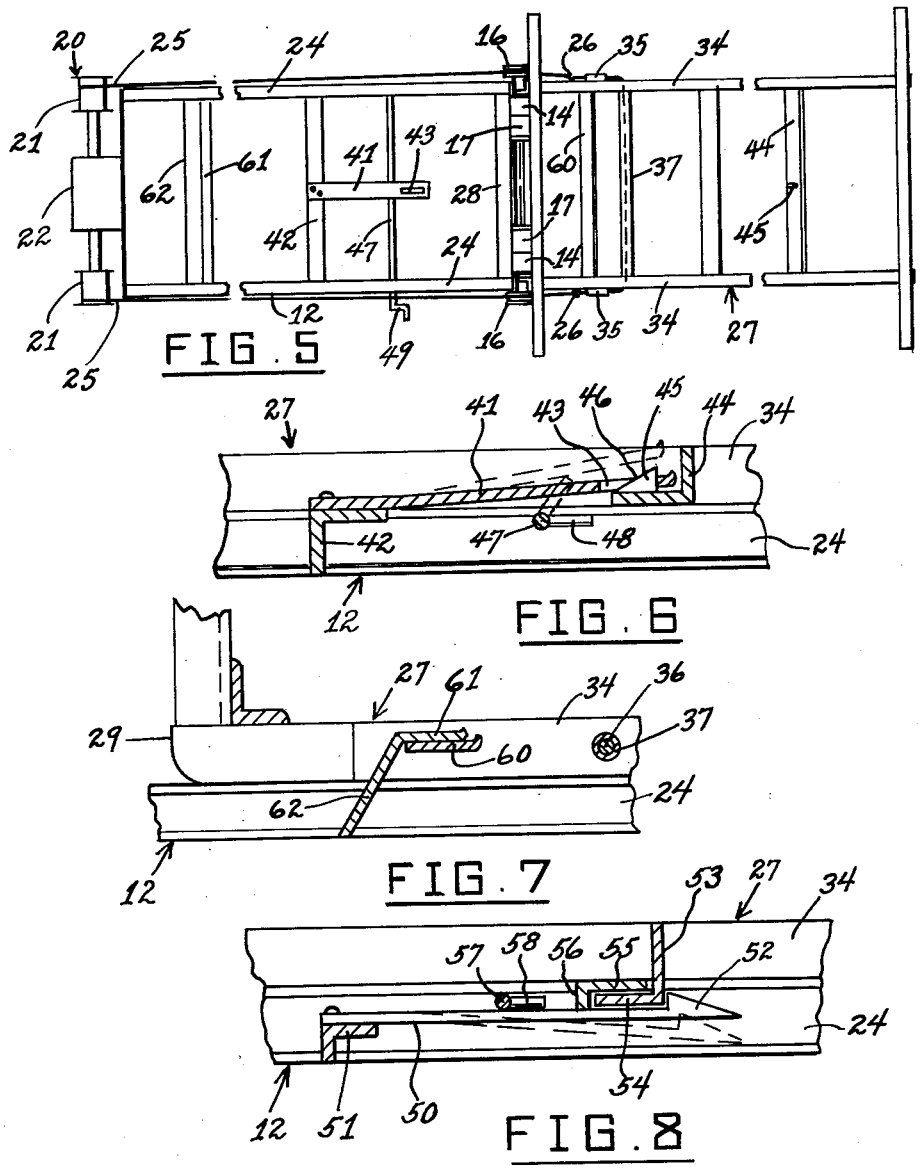
INVENTOR.
MIKKO TERHO
BY Herman L. Gordon
ATTORNEY

United States Patent Office 3,051,339
Patented Aug. 28, 1962

3,051,339
LOADING AND UNLOADING EQUIPMENT
FOR A MOTOR TRUCK
Mikko Terho, Naantali, Finland
Filed Dec. 30, 1957, Ser. No. 705,997
5 Claims. (Cl. 214—505)

This invention relates to loading and unloading equipment for a truck, and more particularly, for a truck of the type provided with a pivotally supported platform which is rotatable around a transverse axis located at the rear end of the truck body, and which platform is arranged to receive a load-carrying skid.

A main object of the invention is to provide a novel and improved skid-carrying vehicle which is easy to load and unload, and which is provided with a pivoted supporting platform adapted to receive a load-carrying skid and with winch means having cables attachable to the skid, cooperating means being further provided on the vehicle and skid to positively control the position of the cable means adjacent the point where the skid first engages the truck during the loading operation and last engages the truck during the unloading operation.

A further object of the invention is to provide an improved skid-carrying vehicle of the type having a pivoted skid-supporting platform provided with winch means thereon to pull a skid onto the platform by means of cables associated with said winch means, the structure being relatively simple, being reliable in operation, and requiring no cables between the platform and the main body of the vehicle.

A still further object of the invention is to provide an improved skid-carrying vehicle of the type having a pivoted skid-supporting platform provided with winch means thereon to pull a skid onto the platform by means of cables extending from the winch means to the skid, the structure having means to accurately control the positions of the cables while the skid is being loaded on or being unloaded from the platform, and with means to securely retain the skid on the platform in its transport position.

Further objects and advantages of the invention will become apparent from the following description and claims, and from the accompanying drawings, wherein:

FIGURE 5 is a plan view of the platform and skid in the position of FIGURE 1, with the cargo omitted, said view being taken substantially on the line 5—5 of FIGURE 1.

FIGURE 6 is an enlarged fragmentary vertical cross-sectional view taken longitudinally through the cooperating locking members on the skid and the pivoted supporting platform of FIGURE 1, showing how the skid is locked in transport position on the platform.

FIGURE 7 is an enlarged fragmentary vertical cross-sectional view taken longitudinally through the forward portions of the skid and the supporting platform, showing the cooperating means for retaining the skid against upward movement relative to the platform when the skid is in transport position on the platform.

FIGURE 8 is a vertical cross-sectional view similar to FIGURE 6, but showing a modified form of cooperating locking means on the skid and supporting platform.

Figure 1:
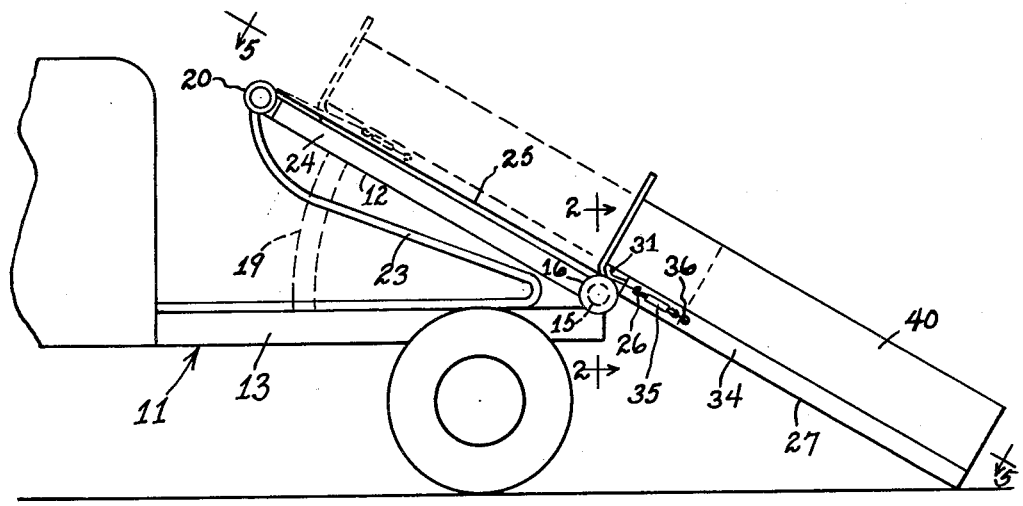
FIGURE 1 is a side elevational view of the rear portion of a skid-carrying vehicle according to the present invention, showing a skid being loaded thereon, with the skid substantially in the position where it first engages the vehicle.

Referring to the drawings, 11 designates the chassis of a truck provided with a supporting platform 12 which is pivoted to the rear transverse edge portion of the truck bed 13 for swinging movement in a vertical direction, namely, around the axis of a transverse roller shaft 15 journalled to the rear transverse margin of the truck bed 13. The platform 12 may be suitably hinged to the roller shaft 15, as by the provision of hinge lugs 14 on the transverse end bar 28 of the platform. The roller shaft 15 may be journalled to the truck bed 13 by the provision of bearing brackets 17 secured on the rear transverse margin of the truck bed. The roller shaft 15 is provided at its ends with enlarged circular flanges 16 formed with peripheral grooves 18.

Suitable conventional lifting and lowering means is provided for the pivoted supporting platform 12, said means being diagrammatically illustrated at 19. The means 19 may be either manually operated or machine-driven.

A winch mechanism, designated generally at 20, is mounted on the front end of the platform 12, said mechanism preferably comprising a pair of windlass reels 21, 21 driven by a hydraulic motor 22. The motor 22 is driven from a suitable compressor, not shown, through a flexible conduit 23, the compressor being driven from the motor of the truck.

The windlass reels are substantially aligned with the respective longitudinal side bars 24, 24 of the platform 12, and are provided with respective cable wires 25, 25 wound thereon, the ends of the cable wires being formed to connect with respective hooks 26, 26 provided on the sides of a skid 27 to be loaded onto the platform 12.

Figures 2, 3:
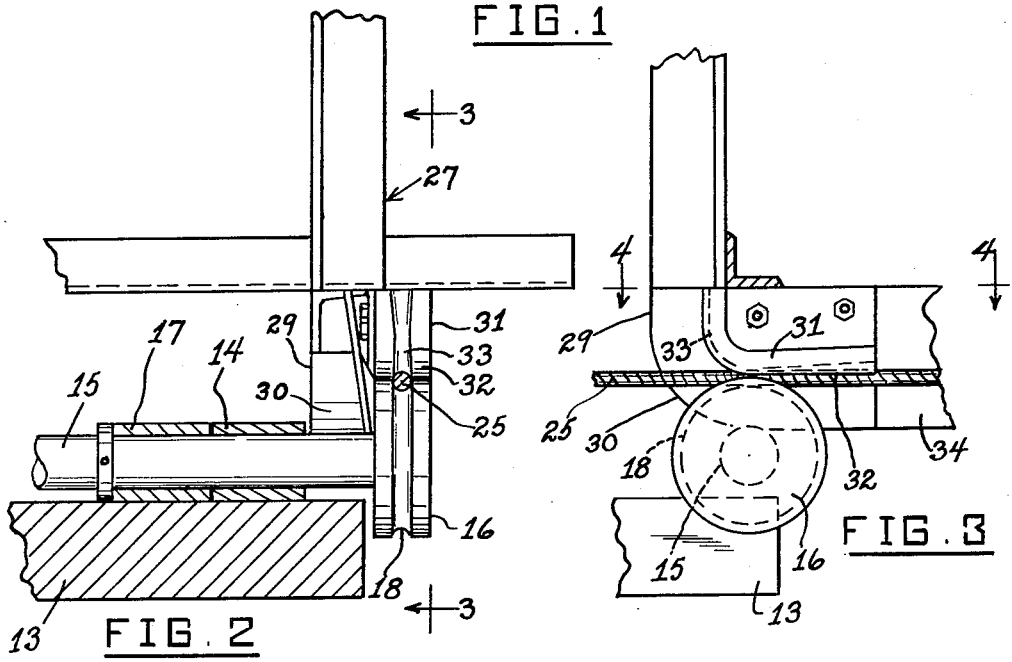
FIGURE 2 is an enlarged fragmentary vertical cross-sectional view taken substantially on the line 2—2 of FIGURE 1.
FIGURE 3 is a fragmentary vertical cross-sectional view taken on the line 3—3 of FIGURE 2.
Figure 4:
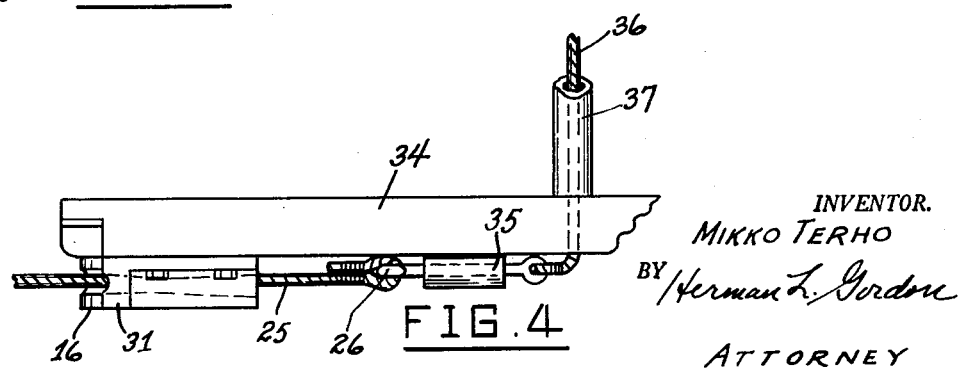
FIGURE 4 is a fragmentary horizontal cross-sectional view taken substantially on the line 4—4 of FIGURE 3.

To facilitate the movement of the skid 27 on the platform 12 the forward end of the skid frame is formed with respective skid shoe elements 29, 29 having arcuately curved main tread portions 30 spaced to slidably engage on the longitudinal side bars 24, 24 of the platform 12. When the skid 27 is elevated by the cable wires 25, 25 to the inclined position thereof shown in full-line view in FIGURE 1, the skid is constrained to assume a position wherein the shoe elements 29, 29 engage on the end portions of roller shaft 15 inwardly adjacent the circular guide flanges 16, as shown in FIGURE 2. This is caused by the provision of outwardly projecting guide wings 31 on the shoe elements 29 having upwardly offset contact surfaces 32 substantially engageable on the peripheries of the circular flanges 16 at the same time that the main tread portions 30 engage on the roller shaft 15, the contact surfaces 32 being formed with guide grooves 33 opposing the peripheral grooves 18 of the circular flanges, the cable wires 25 being received in the opposing grooves 33 and 18 in the manner illustrated in FIGURES 2 and 3 and being positively held against lateral movement at this time. The grooves 33 extend continuously along the bottom surfaces of the guide wings and guide the cable wires 25 toward the hooks 26. When the skid is elevated further onto the platform 12, for example, from the full-line position of FIGURE 1 towards the dotted line position thereof, the longitudinal supporting rails 34, 34 of the skid are guided so as to ride on the roller shaft 15 inwardly adjacent the circular flanges 16 and to engage on the longitudinal side bars 24, 24 of the platform.

The hooks 26 are slidably disposed in tubular sleeves or ferrules 35 longitudinally secured to the supporting rails 34, the rear ends of the hooks being secured to the opposite ends of an auxiliary cable wire 36 which extends through the rails 34 and through a tubular ferrule member 37 secured transversely between the rails. In this way, the wire cables 25 are connected to substantially define a continuous loop, allowing the tension in said cables 25 to be equalized during the raising or the lowering of the skid. Due to this arrangement, it is possible to easily elevate a skid 27 onto the supporting platform 12 even if the skid is initially considerably misaligned with respect to the platform, eliminating the necessity of altering the direction of the truck.

Means are provided to lock the skid 27, on which a cargo 40 has been secured, to the supporting platform 12 when the skid has been hoisted into its intended transport position on the platform. Thus, a longitudinally extending flat leaf spring 41 is secured at its forward end to the intermediate portion of a transverse cross bar 42 rigidly secured between the side bars 24, 24 of the platform 12. The free end portion of the leaf spring is formed with a longitudinal slot 43. A transverse cross bar 44 on the rear portion of the skid carries a triangular locking lug 45 having a downwardly and forwardly inclined top edge 46 adapted to cammingly engage beneath the free end edge of the leaf spring and to elevate same until the skid has been moved forwardly to its intended transport position on platform 12, at which time the lug 45 enters the slot 43, locking the skid against rearward movement. A release shaft 47 is journalled transversely in the platform 12 beneath the leaf spring 41 and is provided with a release arm 48 underlying said leaf spring, the shaft 47 being provided at one end with a crank handle 49 for manually rotating the shaft. As shown in dotted view in FIGURE 6, the shaft 47 may be rotated counterclockwise to cause the leaf spring 41 to be flexed upwardly sufficiently to allow lug 45 to disengage from the slot 43. This unlocks the skid to allow it to be unloaded from the supporting platform 12.

FIGURE 8 illustrates an alternate form of skid locking means. A longitudinally extending spring arm 50 is secured at its forward end to a transverse cross bar 51 rigidly secured between the side bars 24 of the platform 12. The free end of arm 50 is formed with a triangular detent lug 52 which is lockingly engageable behind the bottom corner of a transverse angle bar 53 rigidly secured between the rails 34 of the skid. The horizontal, forwardly directed bottom flange 54 of the angle bar is receivable beneath the rearwardly directed horizontal top flange 55 of an angle bar 56 rigidly secured between the side bars 24, 24 of platform 12. A manually rotatable transverse shaft 57 is journalled in the platform 12 forwardly of the angle bar 56 and is provided with an arm 58 overlying the spring arm 50. By rotating the shaft 57 in a clockwise direction, as viewed in FIGURE 8, the spring arm 50 may be flexed downwardly sufficiently to disengage the detent lug 52 from the bottom corner of angle bar 53 and thereby allow the skid to move rearwardly on the platform 12.

Means are further provided to restrain the forward portion of the skid against upward movement in its transport position on platform 12. A transversely extending horizontal plate member 60 is rigidly secured between the forward end portions of the skid rails 34, 34, said plate member, in the transport position of the skid, being engageable beneath the horizontal, rearwardly directed top flange 61 of an obliquely angled transverse cross bar 62 rigidly secured between and rising above the forward portions of the side bars 24, 24 of platform 12, as shown in FIGURE 7.

While certain specific embodiments of loading and unloading equipment for a truck have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a skid carrying vehicle, in combination, a vehicle body having a rear end, a pivotally supported platform mounted on said vehicle body turnable about a transverse axis extending along the rear end of said vehicle body, said platform having a top face, a load carrying skid arranged on said top face of said platform and movable in the axial direction of said vehicle so that when the front end of the platform is raised said skid is slidable downwardly in the rearward direction of said vehicle, a supporting roller rotatably mounted on said platform on said transverse axis and supportingly receiving said load carrying skid, respective flange elements on the opposite ends of said supporting roller acting to limit lateral movement of the skid, longitudinally extending cable means secured at one end to the front end of said skid, and winch means mounted on the front end of said platform and having the other end of said cable means wound thereon, said flange elements being formed with peripheral grooves substantially longitudinally aligned with said cable means and located to receive said cable means, and said skid being provided with respective downwardly facing longitudinally grooved elements at its forward end arranged to move over the flange elements and to cooperate with the peripheral grooves thereof to guide said cable means while the forward end of the skid moves over said roller.

2. The structure of claim 1, and wherein a transversely extending rigid retaining member is secured to the bottom of the skid and the platform is provided with a resilient catch member lockingly engageable with said retaining member when the skid has been hoisted on to the platform.

3. The structure of claim 2, and wherein said retaining member is formed with an upstanding plug having a slanting upper side cammingly engageable beneath said resilient catch member while the skid is moving upwardly, and wherein said catch member is formed with an aperture in which said plug is lockingly receivable.

4. The structure of claim 2, and wherein said catch member is provided with a generally triangular vertical detent element having an oblique upper surface cammingly engageable by said retaining member while the skid is moving upwardly and being subsequently movable upwardly into locking engagement with said retaining member.

5. The structure of claim 1, and wherein said skid is provided with a pair of spaced interconnected hooks loosely fastened to the front end of said skid, the interconnection between the hooks comprising a cable connecting the hooks and a ferrule-like member secured transversely on the skid and slidably receiving the cable, whereby force on one of the hooks is transmitted through said interconnection to the other hook, said cable means being connected to said hooks.

References Cited in the file of this patent

UNITED STATES PATENTS

| | | |
|---|---|---|
| 2,305,762 | Cristofoletti et al. | Dec. 22, 1942 |
| 2,604,219 | Alvare | July 22, 1952 |
| 2,708,045 | Shonte | May 10, 1955 |
| 2,745,566 | Bouffard | May 15, 1956 |
| 2,755,036 | Terho | July 17, 1956 |
| 2,812,088 | Cadillac et al. | Nov. 5, 1957 |
| 2,814,401 | Mendez | Nov. 26, 1957 |
| 2,867,339 | Nelson | Jan. 6, 1959 |